United States Patent [19]
Tank et al.

[11] Patent Number: 5,341,207
[45] Date of Patent: Aug. 23, 1994

[54] MICHELSON INTERFEROMETER

[75] Inventors: Volker Tank, Eching; Peter Haschberger, Gauting; Burkhard Jansen, Hilter, all of Fed. Rep. of Germany

[73] Assignee: Deutsche Forschungsanstalt für Luft - und Raumfahrt e.V., Cologne, Fed. Rep. of Germany

[21] Appl. No.: 926,618

[22] Filed: Aug. 10, 1992

[30] Foreign Application Priority Data

Aug. 30, 1991 [DE] Fed. Rep. of Germany ....... 4128911
Nov. 4, 1991 [DE] Fed. Rep. of Germany ....... 4136300

[51] Int. Cl.$^5$ .............................................. G01B 9/02
[52] U.S. Cl. .................................................... 356/346
[58] Field of Search ................ 356/346; 359/198, 200

[56] References Cited

U.S. PATENT DOCUMENTS

| | | | |
|---|---|---|---|
| 4,383,762 | 5/1983 | Burkert | 356/346 |
| 4,556,316 | 12/1985 | Doyle | 356/346 |
| 4,652,130 | 3/1987 | Tank | 356/346 |
| 5,148,235 | 9/1992 | Tank et al. | 356/346 |

FOREIGN PATENT DOCUMENTS

| | | |
|---|---|---|
| 0411250 | 2/1991 | European Pat. Off. . |
| 3346455 | 7/1985 | Fed. Rep. of Germany . |
| 3920117 | 1/1991 | Fed. Rep. of Germany . |
| 3928488 | 3/1991 | Fed. Rep. of Germany . |
| 4005491 | 8/1991 | Fed. Rep. of Germany . |
| 4013399 | 10/1991 | Fed. Rep. of Germany . |

OTHER PUBLICATIONS

Peter Burkert et al., "A Compact High-Resolution Michelson Interferometer for Passive Atmospheric Sounding (MIPAS)," *IEEE Transactions On Geoscience and Remote Sensing*, GE-21 (1983) Jul. No. 3, New York, USA.

*Primary Examiner*—F. L. Evans
*Attorney, Agent, or Firm*—Browdy and Neimark

[57] ABSTRACT

In each arm of a Michelson interferometer (IF) a retroreflector (110; 110') having its aperture plane aligned perpendicularly to the optical axis is mounted on a respective holder (106; 106') which in turn is rigidly connected to one end of a shaft (105; 105') rotatably mounted in a connecting member (103; 103'). To the other end of the shaft (105; 105') a first gear ($107_1$; $107_1'$) is secured which is coupled via a toothed belt (909; 109') to an identically configured second gear ($107_2$; $107_2'$) which concentrically to a drive shaft (102; 102') of an electric motor (101; 101') is rigidly connected to the housing (1010; 1010') thereof. At a predetermined distance from the shaft (105; 105') the drive shaft (102; 102') is fixedly connected to the connecting member (103; 103') so that on rotation of the motor drive shafts (102; 102') the length of the optical paths is shortened in one interferometer arm and lengthened synchronously therewith in the other interferometer arm, or vice versa. Furthermore, the aperture planes of the two retroreflectors (110, 110') always remain unchanged aligned perpendicularly to the optical axis (FIG. 2).

7 Claims, 7 Drawing Sheets

MICHELSON INTERFEROMETER

BACKGROUND OF THE INVENTION

1. Field of the Invention

The invention relates to a Michelson interferometer comprising a beam splitter, two stationary plane mirrors enclosing an angle of 90° with each other and of 45° with the beam splitter in each case, a collecting lens, a detector for the signal radiation, a laser reference unit consisting of a laser and a laser detector and two retroreflectors or two roof edge mirrors. The invention also concerns a Michelson interferometer comprising two plane mirrors and a rotating retroreflector with associated drive motor, the retroreflector rotation axis being offset laterally with respect to the triple point of the retroreflector, two deflection mirrors, a beam splitter, a collecting lens, a detector and a laser reference unit comprising laser and laser detector. Such an interferometer is used in Fourier transform spectroscopy (FTS) in which optical path differences are generated by rotating retroreflectors.

2. Description of the Prior Art

Michelson interferometers are known which are also referred to as "Fourier spectrometers" in which optical path differences are generated by rotating retroreflectors (for example DE 40 05 491 A1). Eccentrically and inclined "nutating" retroreflectors are used. To generate relatively large optical path differences, i.e. a higher spectral resolution, two or more retroreflectors are set in asynchronous rotation with respect to the optical path change in the two interferometer arms, and a fixed phase relationship of the different rotational movements to each other must be maintained.

The known Michelson interferometers with rotating retroreflectors have however the following disadvantages:

1. To obtain a high spectral resolution the interferometer cannot be operated with only one reflector; two or more of these relatively expensive elements are required.
2. Complicated steps must be taken for the necessary maintenance of the fixed phase relationship of the different rotational movements of the two or more retroreflectors with respect to each other. A very advantageous solution is the drive of each retroreflector with its own stepping motor and the "electrical coupling" of all the motors to each other by means of only one common control clock for all motors. However, this in turn has the following disadvantages: The mechanical vibrations of the stepping operation of the motors is transmitted to the entire structure in a manner disturbing for the measuring signal; these vibrations must therefore be eliminated by additional complicated mechanical damping steps. Furthermore, the total expenditure is increased by each additional drive motor. Also, stepping motors are fundamentally more expensive than comparable DC voltage motors which suffice for the operation with only one retroreflector.

If two or more retroreflectors are driven by only one motor, coupling via a transmission is necessary. This again makes the expenditure greater and introduces additional interference sources into the construction due to transmission play, which cannot be completely excluded.

3. Each further retroreflector has optical errors which lead to an additional impairment of the quality of the optical signal of the apparatus. This could be avoided only by retroreflectors of extremely high quality; this would result however in an extremely expensive apparatus.
4. To avoid undesirably large mechanical dimensions of the apparatus with the known interferometers having only one rotating retroreflector, in the second interferometer arm as well a (however) fixed retroreflector is installed by which in particular the optical path is convoluted and a small mechanical overall size thereby made possible. However, this results in all the disadvantages already described above due to the use of a second retroreflector.

The invention therefore has as its object the provision of a Michelson interferometer which with relatively low expenditure permits a high resolution.

The invention therefore proposes in a Michelson interferometer comprising a beam splitter, two stationary plane mirrors enclosing an angle of 90° with each other and 45° with the beam splitter in each case, a collecting lens, a detector for the signal radiation, a laser reference unit consisting of a laser and a laser detector and two retroreflectors, the improvement in which in each arm of the interferometer a retroreflector having its aperture plane aligned perpendicularly to the optical axis is mounted on a respective holder which in turn is rigidly connected to one end of a shaft rotatably mounted in a connecting member and to the other end of which a first gear is secured which is coupled via a toothed belt to an identically configured second gear which lies in the plane of the first gear and which is arranged concentrically to a drive shaft of a stationarily arranged electric motor and is rigidly connected to the housing thereof, the respective drive shaft being fixedly connected at a predetermined distance from the rotatably mounted shaft to the connecting member in such a manner that on rotation of the two drive shafts of the two electric motors the optical path length in one interferometer arm is shortened and in the other interferometer arm is lengthened synchronously therewith and the aperture planes of the two retroreflectors always remain unchanged aligned perpendicularly to the optical axis.

The invention also proposes in a Michelson interferometer comprising a beam splitter, two stationary plane mirrors enclosing an angle of 90° with each other and 45° with the beam splitter in each case, a collecting lens, a detector for the signal radiation, a laser reference unit consisting of a laser and a laser detector and two 90° roof edge mirrors, the improvement in which in each arm of the interferometer a 90° roof edge mirror having its aperture plane aligned perpendicularly to the optical axis is mounted on a respective holder which in turn is rigidly connected to one end of a shaft rotatably mounted in a connecting member and to the other end of which a first gear is secured which is coupled via a toothed belt to an identically configured second gear which lies in the plane of the first gear and which is arranged concentrically to a drive shaft of a stationarily arranged electric motor and rigidly connected to the housing thereof, the respective drive shaft being fixedly connected at a predetermined distance from the rotatably mounted shaft to the connecting member in such a manner that on rotation of the two drive shafts of the two electric motors the optical path length in one interferometer arm is shortened and in the other interferometer arm is lengthened synchronously therewith and the aperture planes of the two 90° roof edge mirrors always remain unchanged aligned perpendicularly to the optical axis, and in which the aperture of each 90° roof edge mirror is twice the diameter of the beam passing through the interferometer and length (along the roof edge) is equal to the diameter of a rotation circle of the 90° roof edge mirror plus the diameter of the beam.

The invention also proposes in a Michelson interferometer comprising a beam divider, two stationary plane mirrors enclosing an angle of 90° with each other and 45° with the beam splitter in each case, a collecting lens, a detector for the signal radiation, a laser reference unit consisting of a laser and a laser detector and two retroreflectors, the improvement in which in each arm of the interferometer a retroreflector having its aperture plane aligned perpendicularly to the optical axis is mounted on a respective holder which in turn is secured to a gear which is mounted rotatably on a shaft-like extension of a connecting member on different sides of the connecting member two identically configured gear pairs each comprising two different gears coupled by a respective toothed belt are arranged, the first gears of each gear pair being secured to the two ends of a shaft mounted in the connecting member whilst substantially opposite the gear rotatably mounted on the extension of the connecting member the second gear of a gear pair facing a stationarily arranged drive motor is secured concentrically to the drive shaft thereof to the motor housing, the respective drive shaft being fixedly connected at a predetermined distance from the rotatably mounted shaft to the connecting member in such a manner that on rotation of the two drive shafts of the two electric motors the optical wavelength in one interferometer arm is shortened and in the other interferometer arm is lengthened synchronously therewith and the aperture planes of the two retroreflectors always remain unchanged aligned perpendicularly to the optical axis.

The invention also proposes in a Michelson interferometer comprising two plane mirrors, a rotating retroreflector with associated drive motor, the retroreflector rotation axis being laterally offset with respect to the triple point of the retroreflector, two deflecting mirrors, a beam splitter, a collecting lens, a detector and a laser reference unit with laser and laser detector, the improvement in which the rotating retroreflector is arranged as sole retroreflector for two interferometer arms in such a manner that both beam halves split by the beam splitter and incident on a respective deflecting mirror are deflected into aperture subregions of the single retroreflector which lie opposite each other with respect to the retroreflector rotation axis, the optical axes of the two beam halves being inclined to each other an angle of $2\alpha$ and to the retroreflector rotation axis an inclination angle $\alpha$.

Advantageous further developments of the invention are the subject of the subsidiary claims.

According to the invention an interferometer structure is provided in which a high spectral resolution is implemented with low technical expenditure. Due to the relatively simple construction balancing can easily be carried out. Furthermore, the beam in operation is incident only on mirror surfaces of the same inclination so that no changing polarizations can occur.

A further preferred embodiment of an interferometer contains only one rotating reflector. The high spectral resolution achieved with low technical expenditure corresponds to that which in other constructional forms could be achieved only with two rotating retroreflectors. In spite of the low expenditure, at the same time the possible interference sources are reduced. Since both beam halves run through the same reflector they are "optically coupled". The drive can therefore be effected with a simple direct current motor without a transmission causing disturbances or any stepping controls also causing disturbances, and is thus also technically less complicated.

BRIEF DESCRIPTION OF THE DRAWINGS

Hereinafter, the invention will be explained in detail with reference to preferred embodiments with the aid of the attached drawings, wherein:

FIG. 1b is a sectional view along the line A-B of FIG. 1a;

FIG. 2 is a schematic illustration of an interferometer having two units each with a retroreflector according to FIG. 1a;

DESCRIPTION OF THE PREFERRED EMBODIMENTS

Figure 1B:
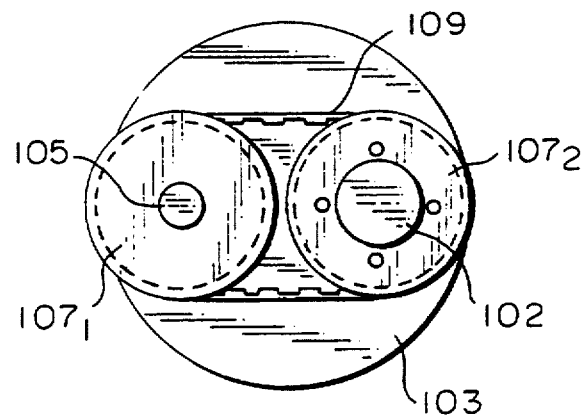
Figure 1A:
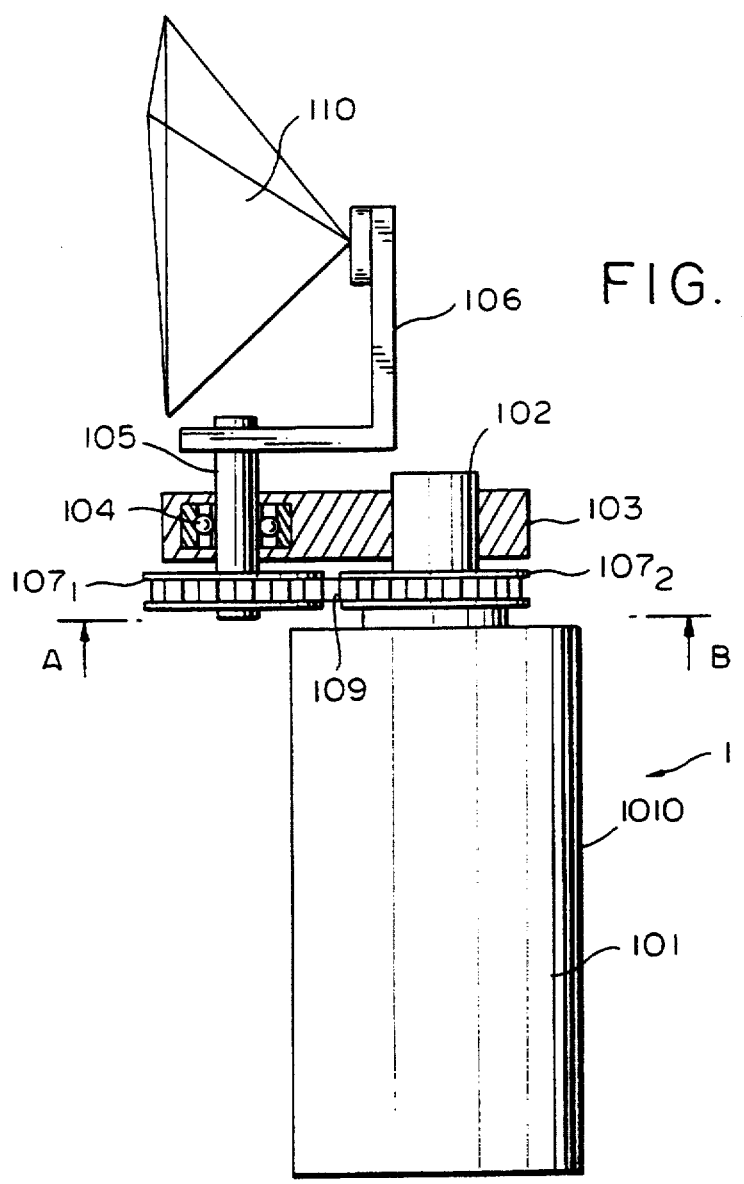
FIG. 1a is a side elevation of a schematic illustration of a first embodiment of a unit comprising a drive, a holder, a retroreflector and two gears for an interferometer having retroreflectors.

In FIG. 1a a unit 1 is illustrated in a side view and in FIG. 1b in a sectional view along a line A-B of FIG. 1a, said unit comprising a stationary electric motor 101 which is accommodated in a housing 1010 and the drive shaft 102 of which is rigidly connected to a connecting member 103, preferably in the form of a circular disc. A shaft 105 is rotatably mounted in a ballbearing 104 in the connecting member 103 parallel to the drive shaft 102. A holder 106 is mounted on one end of the shaft 105 and carries a retroreflector 110 mounted thereon. A first gear $107_1$ is fixedly connected to the other end of the shaft 105. An identically configured second gear $107_2$ is rigidly connected to the motor housing 1010 concentrically with the drive shaft 102. The two gears $107_1$ and $107_2$ lie in a plane and are coupled together via a toothed belt 109.

As soon as the drive shaft 102 is driven by the electric motor 101 the connecting member 103 also rotates along with the shaft 105 and thus also the holder 106 which carries the retroreflector 110 and which thereby executes a further rotational movement relative to the drive shaft 102. In the second rotational movement, by the gears $107_1$ and $107_2$ coupled via the toothed belt 109 it is ensured that the alignment of the aperture plane of the retroreflector 110 remains unchanged. The retroreflector then revolves along a circle having a radius which is equal to the distance between the centre axes of the drive shaft 102 and the shaft 105 mounted in the connecting member 103.

This distance defines the optical path difference and thus the spectral resolution which can be achieved. On a single passage through the unit 1 accommodated in an interferometer arm the path difference for a complete revolution of the drive shaft 102 and thus the shaft 105 is equal to the diameter of the circle defined above.

Figure 2:
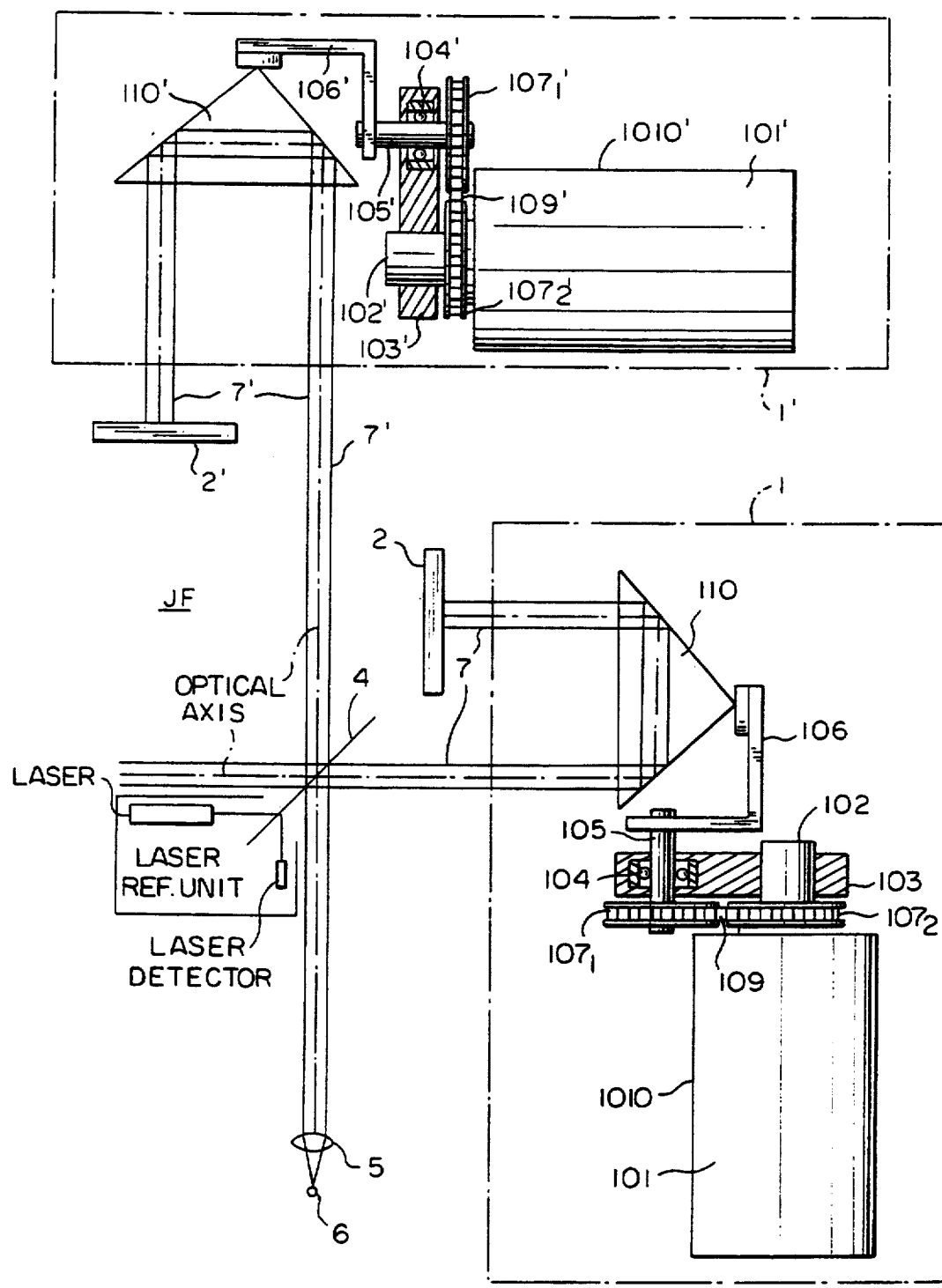

In FIG. 2 two of the units 1 illustrated in FIG. 1a are provided in the two arms of a schematically indicated interferometer IF, the unit 1' shown in FIG. 2 in the upper part being identical to that in FIG. 1a or the unit 1 shown in FIG. 2 in the right part; solely for the purpose of distinguishing between them, the unit 1' and the elements provided therein are each provided with an apostrophe. In addition to the units 1 and 1' the interferometer IF comprises the following components, that is a beam splitter 4, two stationary plane mirrors 2 and 2' arranged at an angle of 90° to each other and at an angle of 45° to the beam splitter 4 in each case, a collecting lens 5 and a detector 6 which follows the latter and is sensitive to the signal radiation.

Furthermore, as is known in the interferometer IF a so-called laser reference unit is provided which consists of a laser, for example in the form of an HeNe laser, and of a laser detector, for example in the form of a radiation-sensitive silicon diode.

As illustrated in FIG. 2, the orientations of the units 1 and 1' with respect to each other is set so that in the illustration shown the optical path in the interferometer arm of the unit 1' is a maximum and in the unit 1 is a minimum.

The electric motors 101 and 101' in the units 1 and 1' are driven in such a manner that they perform synchronous rotations so that for example by the rotation of the one interferometer arm in which the unit 1 is provided a shortening is effected whilst the interferometer arm with the unit 1' is synchronously lengthened, and vice versa. The drive of the retroreflectors 110 and 110' is thus in opposite synchronism.

Beams 7 and 7' are also indicated in the two interferometer arms. As apparent from FIG. 2, each beam 7, 7' passes through the respective retroreflector 110 and 110' twice, once on the journey to the plane mirror 2 and 2' and once on the return path. The path difference which can be achieved between the two arms of the interferometer thus corresponds to four times the diameter of the rotation circle of the retroreflector 110 or 110' described with the aid of FIG. 1a.

Figure 3:
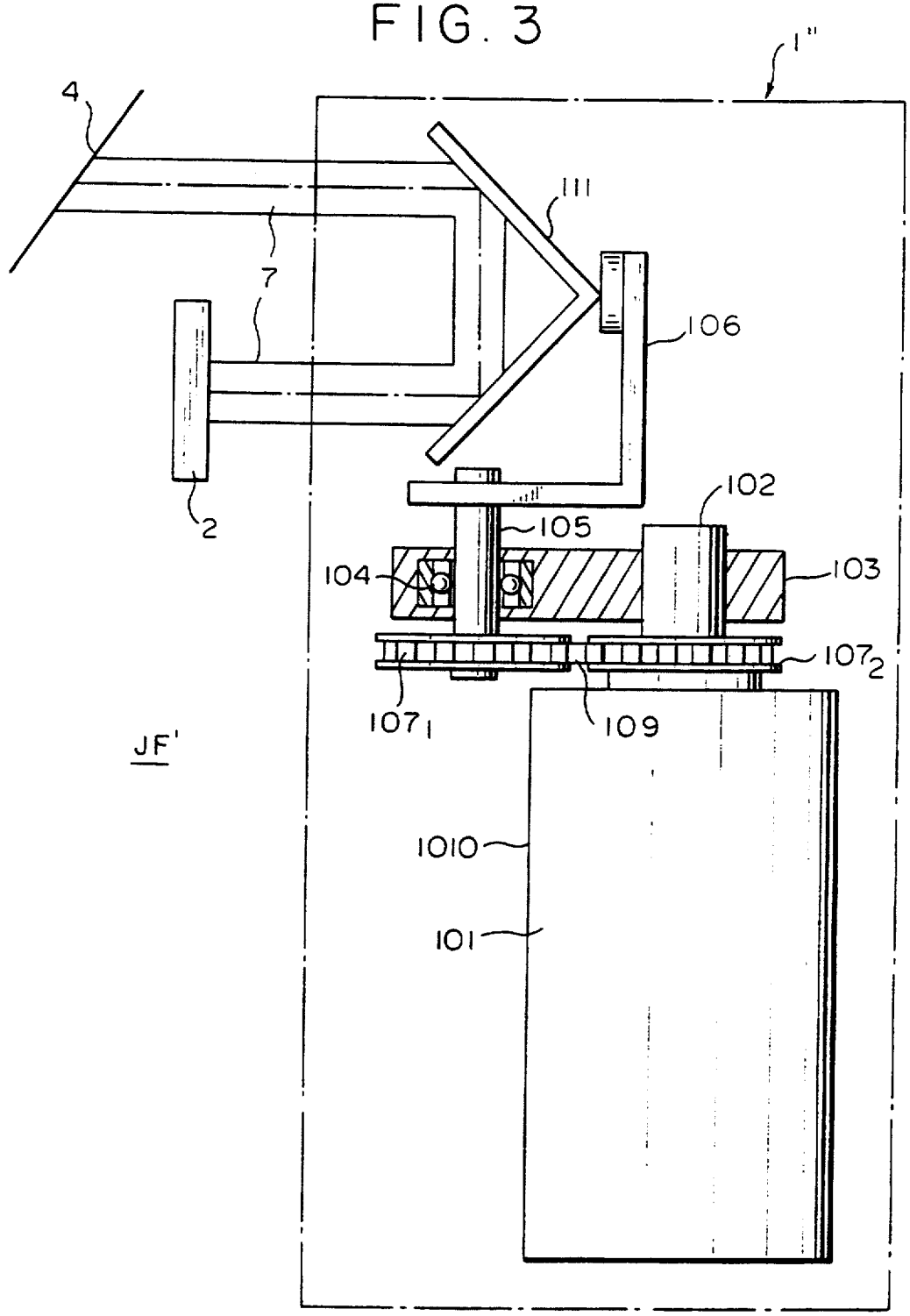
FIG. 3 is a schematic illustration of a second embodiment of a unit according to FIG. 1a having a roof edge inner mirror instead of a retroreflector.

In FIG. 3 an arm of a further interferometer IF' is illustrated in which for folding the beam path 7 is conducted via a 90° roof edge inner mirror 111; the roof edge inner mirror 111 is secured analogously to the retroreflector 110 in FIG. 1a to the holder 106 and can thus be set in rotation in a unit 1" corresponding to the unit 1 in FIG. 1a. The beam paths 7 then pass from the beam splitter 4 via the roof edge inner mirror 111 to the fixed plane mirror 12 and back along the same path.

To simplify the illustration, in FIG. 3 the usual components of the interferometer IF', such as collecting lens, detector, laser and laser detector, have been omitted. On providing one unit 1" in each case, in these two units 1" the electric motors 101 are again likewise synchronously oppositely driven so that by the rotation of the one interferometer arm is for example shortened and the other interferometer arm lengthened, and vice versa.

The advantage of using 90° roof edge inner mirrors 111 resides in that on the one hand they can be adapted in their width to the beam 7 to be transmitted and on the other can be adapted in their length to the desired spectral resolution (path difference). The length necessary here for a desired spectral resolution must be at least equal to the diameter of the revolution or described circle defined with the aid of FIG. 1a plus the diameter of the beam 7.

Figure 4:
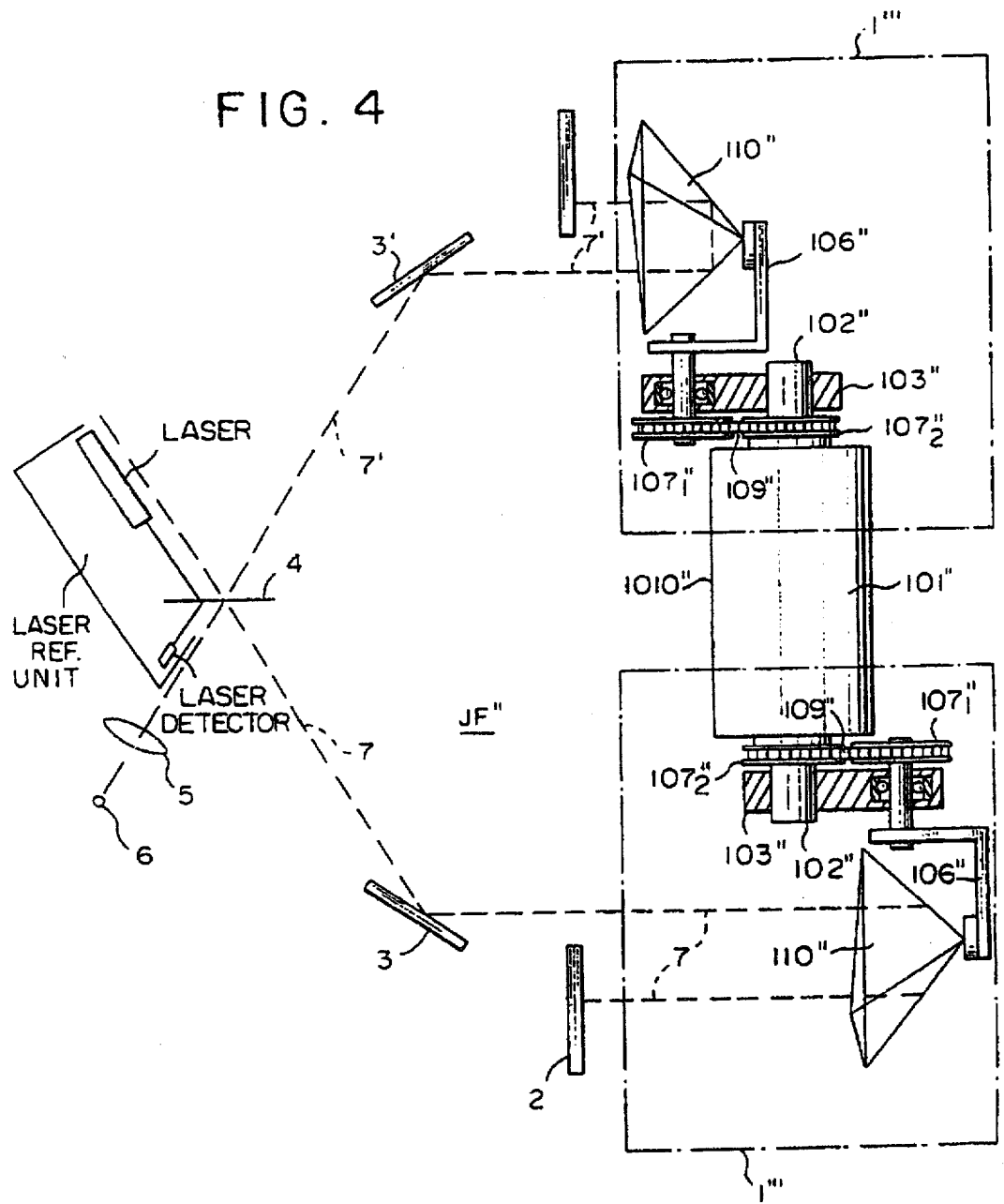
FIG. 4 is a schematic illustration of a third embodiment of an interferometer having retroreflectors driven by means of only one drive.

In FIG. 4 an interferometer IF" having two units 1''' is shown which differ from the units 1 and 1' of FIG. 1a and FIG. 2 in that the two units 1''' are mounted on the two shaft ends of a common drive motor 101". Apart from the common motor 101" employed and additionally provided deflecting mirrors 3 and 3' for guiding the beam 7 and 7' the structure of the interferometer IF" corresponds fundamentally to that of the interferometer IF in FIG. 2. By means of the orientation of the two units 1''' with respect to each other it is achieved that the path changes in the two interferometer arms are again in the opposite sense so that by the rotational movement of the retroreflectors 110" the one interferometer arm is shortened and the other is lengthened synchronously therewith, and vice versa.

Figure 5:
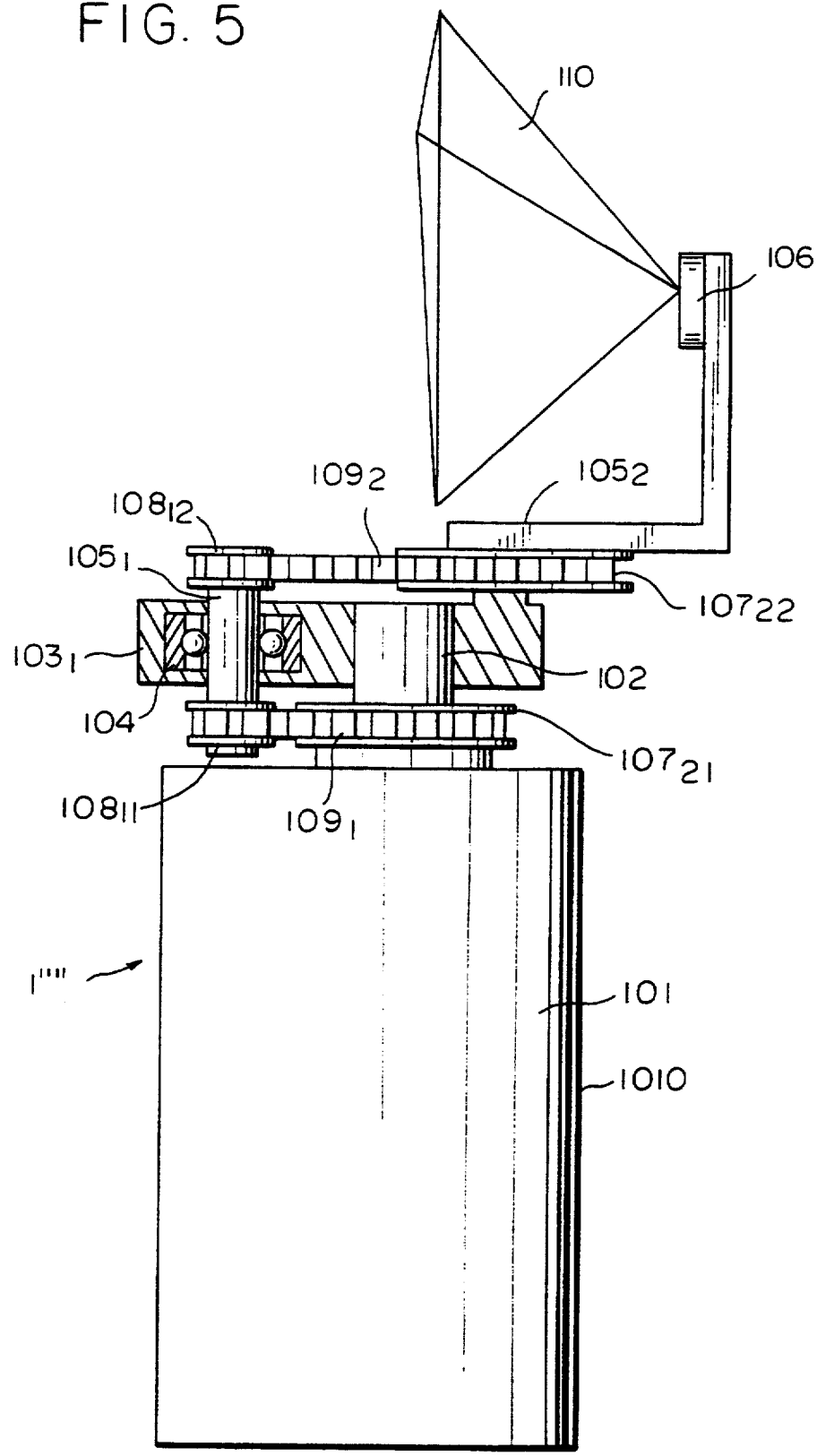
FIG. 5 shows a modification of a unit provided in FIGS. 1 to 4 having a total of four gears and two tooth belts.

In FIG. 5 a unit 1"" is shown in which in contrast to the unit 1 shown in FIG. 1a two gear pairs comprising gears $107_{21}$ and $108_{11}$ and $107_{22}$ and $108_{12}$ are provided. The gears $108_{11}$ and $108_{12}$ are mounted on the two ends of a shaft $105_1$ which is mounted by means of a ballbearing 104 in a connecting member $103_1$. The gear $107_{22}$ to which the holder 106 for a retroreflector 110 is secured is rotatably mounted on a shaft-like extension $105_2$ formed on the connecting member $103_1$. Between the gears of the two gear pairs $107_{21}, 108_{11}$ and $107_{22}, 108_{12}$ respective toothed belts $109_1$ and $109_2$ are provided. The gear $107_{21}$ is again fixedly connected to the motor housing $101_0$ of the motor 101.

Due to the arrangement of the two gear pairs in FIG. 5 small distances can be implemented between the drive shaft 102 and the extension $105_2$ on which the gear $107_{22}$ is rotatably mounted. Such an arrangement is necessary when using retroreflectors with small aperture in order to ensure that the incident beam (not shown in FIG. 5) completely reaches the aperture of the retroreflector 110 in every rotational position thereof.

It is important with the arrangement illustrated in FIG. 5 for the gear pairs to be identically configured. In this case, in contrast to the different gears $107_{21}$ and $108_{11}$ shown in FIG. 5 four equally configured gears may also be employed. During operation the retroreflector 110 in FIG. 5 revolves on a circular orbit having a radius which is equal to the distance between the centre axes of the drive shaft 102 and the shaft-like extension $105_2$. This distance can be made as small or large as desired independently of the size of the gears and thus adapted to the desired spectral resolution and the size of the aperture of the retroreflector 110.

In modification of the embodiment of FIG. 5 the shaft-like extension $105_2$ on which the gear $107_{22}$ is rotatably mounted may be made displaceable or adjustable with respect to the connecting member $103_1$ in the direction of the connecting line of the centre axes of the shaft $105_1$ and the extension $105_2$. This then enables the spacing of the axis centres of the drive shaft 102 and the extension $105_2$ and thus the spectral resolution of the apparatus to be varied. The difference in the toothed belt length thereby occurring is compensated via an additional tensioning gear (not shown) which ensures that the toothed belt $109_2$ is always taut with positive engagement.

The embodiment illustrated in FIG. 5 can also be provided in only one arm of an interferometer whilst the second arm is provided for example with the unit 1 illustrated in FIG. 1a.

Between the axis of the shaft 102 of the drive motor 101 and the aperture surface of the retroreflector 110, which extend parallel in the embodiments hitherto illustrated, it is also possible to provide an inclination. In such a case the orientation of the other optical components is then to be adapted to this inclination in corresponding manner.

To balance the entire interferometer arrangement, firstly the reflector and the components rigidly connected thereto are to be balanced separately from the remaining mechanism. Thereafter, the entire unit 1 is to be balanced. This procedure is necessary because in operation in each unit two rotational movements are superimposed on each other.

Figure 6:
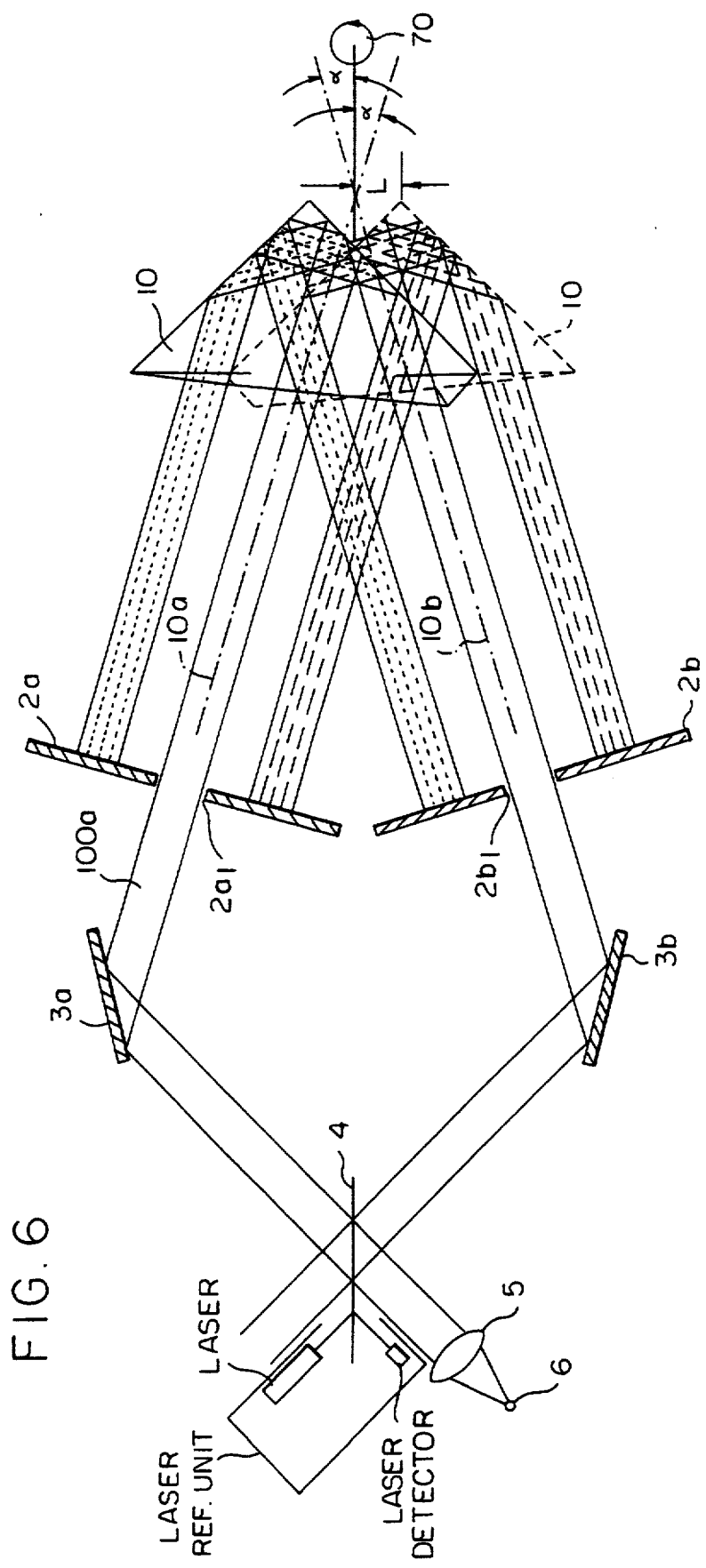
FIG. 6 is a plan view of a schematic illustration of a fourth embodiment of the interferometer according to the invention.

In FIG. 6, in plan view a rotatable retroreflector 10 is illustrated in two extreme rotational positions shown in full and dashed line, the rotation axis 70 of which is offset laterally with respect to the triple point of the retroreflector 10 by a distance L. Furthermore, two plane mirrors 2a and 2b each having a concentric bore $2a_1$ and $2b_1$ as well as two deflecting mirrors 3a and 3b are shown. Also, optical axes 10a and 10b are shown as well as a beam splitter 4, a collecting lens 5 and a detector 6. The inclination angle of the optical axes 10a and 10b with respect to the rotation axis 70 is denoted by $\alpha$.

The interferometer in FIG. 6 further comprises the following components, not shown therein for reasons of clarity: a (not shown) drive motor which sets the retroreflector 10 in rotation about the rotation axis 70 in known manner and a known laser reference consisting of a laser, for example in the form of an HeNe laser, and a laser detector in the form of a radiation-sensitive silicon diode.

The radiation incident on the beam splitter 4 for example at 45° is broken down into two halves 100a and 100b symmetrical with respect to the two optical axes 10a and 10b respectively and said halves are incident on the plane mirrors 3a, 3b, reflected by the latter, passed through the bores $2a_1$ and $2b_1$ of the plane mirrors 2a and 2b and enter the reflector 10 on respective different sides of the rotation axis 70. The beam halves leave the retroreflector each parallel to the entrance direction, are incident perpendicularly on the plane mirrors 2a and 2b, are reflected back into themselves by said mirrors and therefore return to the beam splitter 4 along the same path.

At the beam splitter 4 the two beams recombine in known manner and their sum is focussed by the collecting lens 5 onto the detector 6. Path differences between the two reference surfaces of the beam halves result from the path lengths for the two beam halves 100a and 100b changing in opposite senses due to the rotation of the retroreflector 10, the mirror surfaces 2a and 2b serving as reference surfaces.

Figure 7:
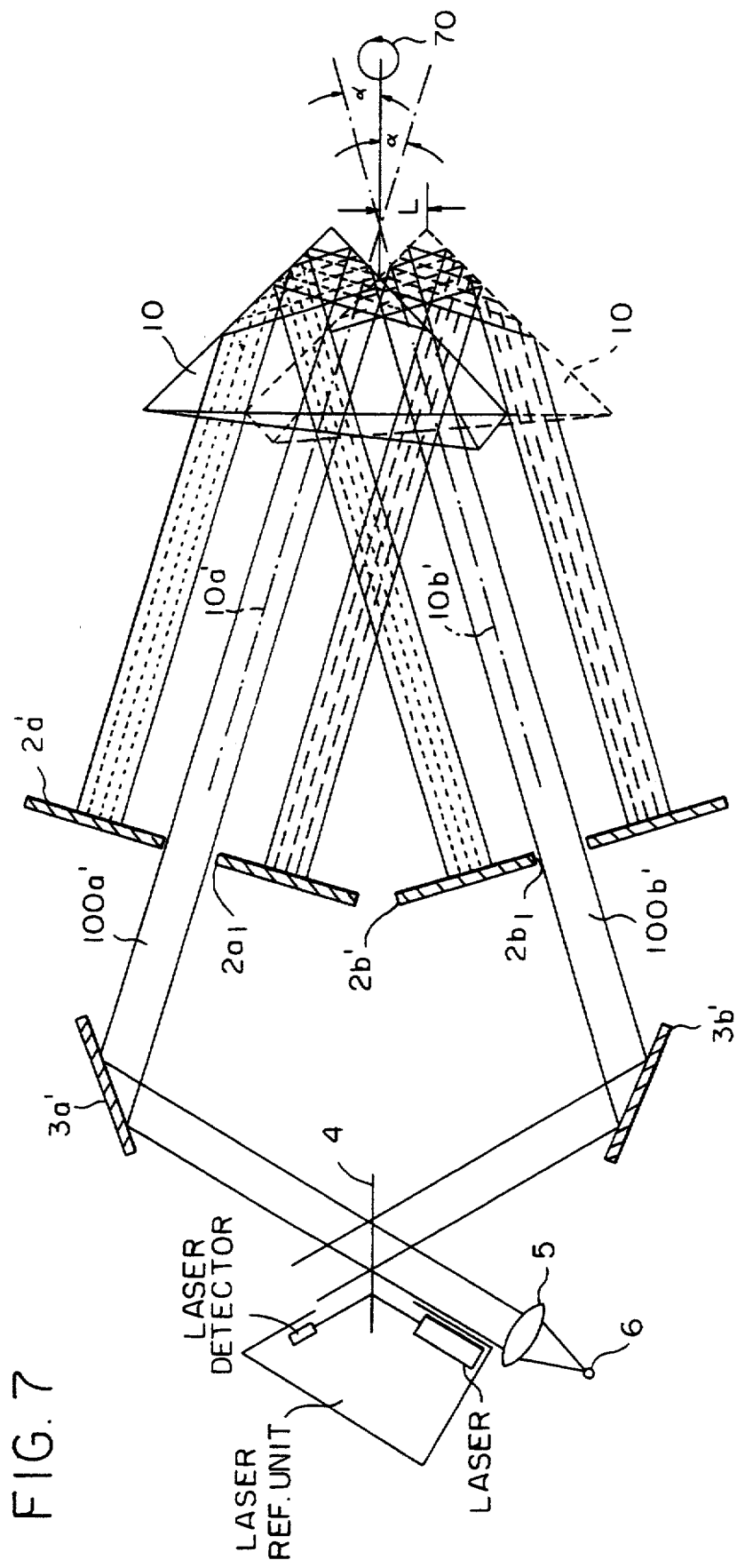
FIG. 7 shows likewise in plan view a schematic illustration of a fifth embodiment of an interferometer according to the invention with optimized beam path.

The arrangement in FIG. 7 corresponds in all details to that of FIG. 1, except for the following modifications: In FIG. 7 an incident beam strikes the beam splitter 4 at an angle of 30° to the vertical. Consequently, on leaving the beam splitter 4 the optical axes 10a' and 10b' of the two beams enclose an angle of 120°. Consequently, the beams 100a' and 100b' are incident on the deflecting mirror 3a' and 3b' at an angle which is in each case 7.5° steeper than in the embodiment of FIG. 6 in order then to enter the retroreflector 10 at an angle $\alpha$ with respect to the rotation axis 70. In this manner smaller deflecting mirrors 3a' and 3b' can be used and the polarizations at said mirrors reduced.

In the arrangements illustrated in FIGS. 6 and 7 the spectral resolution can be mechanically adjusted by varying the lateral offset L of the rotation axis 70 with respect to the triple point of the retroreflector 1. On variation of the inclination angle $\alpha$ for adjusting the spectral resolution the remaining components must be readjusted, in particular the optical axes 10a, 10b and 10a', 10b' must in each case be perpendicular to the mirror surfaces of the deflecting mirror 2a, 2b and 2a', 2b'.

The inclination angle $\alpha$ of the optical axes 10a, 10b and 10a', 10b' with respect to the rotation axis 70, which in the description hitherto was always assumed to be constant, need not be the same. In particular, one of the inclination angles may also be 0°. In such a case the path length in said arm is no longer changed on rotation. (This corresponds to the mode of operation of the known construction of an interferometer with one rotating and one fixed retroreflector).

Below, an example is given of the dimensioning of the most important parameters:

| | |
|---|---|
| Useful aperture of the retroreflector: | 12.7 cm |
| Lateral offset L of the rotation axis: | 21 mm |
| Angle $\alpha$ between the optical axes and the rotation axis: | 18°; |
| Maximum path difference achieved: | about 10 cm; |
| Spectral resolution achieved: | better than $0.1\ cm^{-1}$ |

We claim:

1. In a Michelson interferometer with two arms each having an optical axis, comprising a beam splitter intersecting the optical axes, two stationary plane mirrors enclosing an angle of 90° with each other and 45° with the beam splitter in each case, a collecting lens, a detector for signal radiation, and a laser reference unit consisting of a laser and a laser detector, the improvement wherein in each arm of the interferometer (IF) a retroreflector (110; 110') having its aperture plane aligned perpendicularly to its respective optical axis is mounted on a respective holder (106; 106') which in turn is rigidly connected to one end of a shaft (105; 105') rotatably mounted in a connecting member (103; 103') to the other end of which a first gear ($107_1$; $107_1'$) is secured which is coupled via a toothed belt (109; 109') to an identically configured second gear ($107_2$; $107_2'$) which lies in the plane of the first gear ($107_1$; $107_1'$) and which is arranged concentrically to a drive shaft (102; 102') of a stationarily arranged electric motor (101; 101') and is rigidly connected to the housing (1010; 1010') thereof, the respective drive shaft (102; 102') being fixedly connected at a predetermined distance from the rotatably mounted shaft (105; 105') to the connecting member (103; 103') in such a manner that on rotation of the two drive shafts (102; 102') of the two electric motors (101, 101') the optical path length in one interferometer arm is shortened and in the other interferometer arm is lengthened synchronously therewith and the aperture planes of the two retroreflectors (110; 110') always remain unchanged aligned perpendicularly to the optical axis.

2. An interferometer according to claim 1, wherein the optical axis extends in each case parallel to a plane which is defined by a circular path which the triple point of each retroreflector (110; 110') follows in operation, by said plane each retroreflector (110; 110') is divided into two respective halves, a beam (7; 7') enters each reflector (110; 110') only on one side of the respective plane and perpendicular to the aperture surface and leaves said reflector again always on the other side, opposite the exit half of each retroreflector (110; 110') a plane mirror (2, 2') aligned parallel to the aperture surface thereof is arranged, on which the emerging beam (7, 7') is incident perpendicularly, and the beam (7, 7') is reflected from there and passes backwards through the arrangement along the same path.

3. In a Michelson interferometer with two arms each having an optical axis, comprising a beam splitter intersecting the optical axes, two stationary plane mirrors enclosing an angle of 90° with each other and 45° with the beam splitter in each case, a collecting lens, a detector for signal radiation, and a laser reference unit consisting of a laser and a laser detector, the improvement wherein in each arm of the interferometer (IF) a 90° roof edge mirror (111) having its aperture plane aligned perpendicularly to its respective optical axis is mounted on a respective holder (106) which in turn is rigidly connected to one end of a shaft (105) rotatably mounted in a connecting member (103) and to the other end of which a first gear ($107_1$) is secured which is coupled via a toothed belt (109) to an identically configured second gear ($107_2$) which lies in the plane of the first gear ($107_1$) and which is arranged concentrically to a drive shaft (102) of a stationarily arranged electric motor (101) and rigidly connected to the housing (1010) thereof, the respective drive shaft (102) being fixedly connected at a predetermined distance from the rotatably mounted shaft (105) to the connecting member (103) in such a manner that on rotation of the two drive shafts (102) of the two electric motors (101) the optical path length in one interferometer arm is shortened and in the other interferometer arm is lengthened synchronously therewith and the aperture planes of the two 90° roof edge mirrors (111) always remain unchanged aligned perpendicularly to the optical axis, and in which the aperture of each 90° roof edge mirror (111) is twice the diameter of the beam (7) passing through the interferometer (IF) and length (along the roof edge) is equal to the diameter of a rotation circle of the 90° roof edge mirror (111) plus the diameter of the beam (7).

4. In a Michelson interferometer with two arms each having an optical axis, comprising a beam splitter intersecting the optical axes, two stationary plane mirrors enclosing an angle of 90° with each other and 45° with the beam splitter in each case, a collecting lens, a detector for signal radiation, and a laser reference unit consisting of a laser and a laser detector, the improvement wherein in each arm of the interferometer (IF) a retroreflector (110") having its aperture plane aligned perpendicularly to its respective optical axis is mounted on a respective holder (106; 106') which in turn is rigidly connected to one end of a shaft (105; 105') rotatably mounted in a connecting member (103") and to the other end of which a first gear ($107_1$; $107_1'$) is secured which is coupled via a toothed belt (109; 109') to an identically configured second gear ($107_2$; $107_2'$) which lies in the plane of the first gear ($107_1$; $107_1'$) and which is arranged concentrically to two drive shaft ends (102") of a stationarily arranged electric motor (101") and is rigidly connected to the housing (1010; 1010') thereof, the respective drive shaft end (102") being fixedly connected at a predetermined distance from the rotatably mounted shaft (105; 105') to the connecting member (103") in such a manner that on rotation of the two drive shafts (102") of the electric motor (101") the optical path length in one interferometer arm is shortened and in the other interferometer arm is lengthened synchronously therewith in opposite senses and the aperture planes of the two retroreflectors (110") always remain unchanged aligned perpendicularly to the optical axis.

5. A Michelson interferometer comprising a beam divider, two stationary plane mirrors enclosing an angle of 90° with each other and 45° with the beam splitter in each case, a collecting lens, a detector for signal radiation, a laser reference unit consisting of a laser and a laser detector and two retroreflectors, wherein in each arm of the interferometer a retroreflector (110) having its aperture plane aligned perpendicularly to the optical axis is mounted on a respective holder (106) which in turn is secured to a gear ($107_{22}$) which is mounted rotatably on a shaft-like extension ($105_2$) of a connecting member ($103_1$) on different sides of the connecting member ($103_1$) two identically configured gear pairs each comprising two different gears ($107_{21}$, $108_{11}$; $107_{22}$, $108_{12}$) coupled by a respective toothed belt ($109_1$; $109_2$) are arranged, the first gears ($108_{11}$; $108_{12}$) of each gear pair being secured to the two ends of a shaft ($105_1$) mounted in the connecting member ($103_1$) whilst substantially opposite the gear ($107_{22}$) rotatably mounted on the extension ($105_2$) of the connecting member ($103_1$) the second gear ($107_{21}$) of a gear pair facing a stationarily arranged drive motor (101) is secured concentrically to the drive shaft (102) thereof to the motor housing (1010), the respective drive shaft (102) being fixedly connected at a predetermined distance from the rotatably mounted shaft ($105_1$) to the connecting member ($103_1$) in such a manner that on rotation of the two drive shafts (102) of the two electric motors (101) the optical path length in one interferometer arm is shortened and in the other interferometer arm is lengthened synchronously therewith and the aperture planes of the two retroreflectors (110; 110') always remain unchanged aligned perpendicularly to the optical axis.

6. An interferometer according to claim 5, wherein the gear ($107_{22}$) of the gear pair facing the retroreflector (110) mounted rotatably on a shaft-like extension ($105_2$) of the connecting member ($103_1$) is displaceably adjustable in the direction of the connecting line of the centre axes of the two gears ($108_{12}$, $107_{22}$).

7. A Michelson interferometer comprising two plane mirrors (2a, 2b; 2a', 2b') a rotating retroreflector (10) with associated drive motor, the retroreflector rotation axis (70) being laterally offset with respect to the triple point of the retroreflector (20), two deflecting mirrors (3a, 3b; 3a', 3b'), a beam splitter (4), a collecting lens (5), a detector (6) and a laser reference unit with laser and laser detector, wherein the rotating retroreflector (10) is arranged as sole retroreflector for two interferometer branches in such a manner that both beam halves (100a, 100b; 100a', 100b') split by the beam splitter (4) and incident on a respective deflecting mirror (3a, 3b; 3a', 3b') are deflected into aperture subregions of the single retroreflector (10) which lie opposite each other with respect to the retroreflector rotation axis (70) the optical axes (10a, 10b; 10a', 10b') of the two beam halves (100a, 100b; 100a', 100b') being inclined to each other an angle of $2\alpha$ and to the retroreflector rotation axis (70) an inclination angle $\alpha$.

* * * * *